United States Patent Office 3,845,221
Patented Oct. 29, 1974

3,845,221
HICKORY SMOKED FRENCH BARBECUE BAKERY PRODUCTS
Johnnie W. Hall, Lakeland, Fla., assignor to Halped Corporation
No Drawing. Continuation-in-part of abandoned application Ser. No. 45,275, June 9, 1970. This application Aug. 8, 1972, Ser. No. 278,714
Int. Cl. A21d 2/00
U.S. Cl. 426—62                              7 Claims

ABSTRACT OF THE DISCLOSURE

A dry hickory smoke flavored barbecue bakery mix and hickory smoke flavored bakery products are provided according to the present invention. The principal ingredients are flour, dry milk, chili powder, barbecue spices, liquid or powdered smoke, molasses or brown sugar, and yeast. An unexpected synergism exists between the flavoring components and other ingredients which results in a unique retention of smoke flavor in the final baked product.

---

This application is a continuation-in-part of U.S. patent application Ser. No. 45,275, filed June 9, 1970 and now abandoned, entitled "Hickory Smoked French Barbecue Bakery Products and Method of Producing Same."

This application relates to hickory-smoke flavored bakery products as well as hickory-smoke flavored barbecue flour mix for preparing these products.

It is known to incorporate various spices and flavoring ingredients including fruits, nuts, spices, etc., into bakery products such as bread, rolls and cakes. One of the most difficult, but nonetheless desired, flavors and aromas to incorporate into products which must be baked is the "hickory-smoke barbecue" flavor and aroma. Efforts heretofore to impart this quality to bakery products by incorporating particular flavor components have not resulted in food items which retain to a satisfactory extent the desired flavor and aroma. Without wishing to be bound by any theory, it is surmised that the long baking procedure at temperatures of around 400° F. necessary for baked goods drives off the flavor and aroma-imparting essences or otherwise fails to "fix" them in the final product. The result is that the bread, rolls, etc., which are obtained either do not have a good "smoke-barbecue" flavor to begin with or rapidly lose it.

It is therefore an object of the present invention to provide a bakery product and a dry baking mix for preparing bakery products which allow the retention of a hickory-smoke barbecue flavor in the final baked product. The baking mix of this invention has the particular advantage that it can be easily handled and prepared into bakery products or incorporated into known recipes for these products.

According to the present invention it has been found that the flavor and aroma of hickory-smoke can now be preserved and retained in bakery products by means of a unique combination of ingredients as set forth herein which appear to interact in an unexpected synergistic manner. In order to obtain the product of this invention about 25–65 weight percent flour is combined with about 6–11 weight percent dry milk or the equivalent of evaporated whole milk, 1–15 weight percent salt, 2–8 weight percent brown sugar or dry molasses, 2–16 weight percent dry yeast, 7–16 weight percent barbecue-flavored spices, which may be either in the form of powders or sauce or mixture thereof, and 2–6 weight percent liquid or powdered smoke. Advantageously, a product known as "Smoke Yeast" which combines powdered smoke and dry yeast can be employed in the same amounts as the yeast alone and in place of the yeast and liquid/powdered smoke.

Depending on the particular use for which the mixture is intended, various additional ingredients can also be incorporated into the hickory-smoke flavored product of this invention. Typical of these additional components are up to about 16 weight percent, preferably 9–16 weight percent wheat gluten, up to about 4 weight percent, preferably 2–4 weight percent of an emulsifier such as, for example, mono- or di-glycerides of fatty acids or lactic acid, lecithin, and polyoxyethylene sorbitan monostearate, up to about 8 weight percent, preferably 4–8 weight percent additional granulated sugar, and up to about 5 weight percent preservative, preferably about 2–5 weight percent preservative such as calcium or sodium propionate or sodium diacetate.

It should, of course, be understood that the ranges given for amounts of ingredients can be varied to some extent with only relatively minor changes in the flavor, aroma or other characteristics of the resulting product. Obviously, however, if the proportions of ingredients are changed to a very significant extent, the product obtained will also be more noticeably different.

It is further to be understood that some variation in the particular form of ingredients can be carried out within the scope of the present invention. For example, if the mixture is being prepared as a dough, an equivalent amount of liquid milk can be employed in place of powdered milk and liquid rather than solid molasses can be used.

The hickory-smoke flavored product of this invention can be prepared in several different forms including ready-to-bake doughs for breads, rolls and other bakery items and as a dry mix suitable for incorporation with shortening, water and, in some instances, additional flour to make a variety of products.

The dry mix of the present invention is particularly attractive commercially because of its ease of transportation and storage and versatility of use. A preferred formulation for the dry mix comprises 28–35 weight percent flour, 10–14 weight percent salt, 4–6 weight percent dry molasses, 9–11 weight percent milk, 4–6 weight percent chili powder, 9–11 weight percent barbecue powder, 2–4 weight percent preservative, 9–11 weight percent each of wheat gluten and smoke yeast.

Although this dry mix can be employed in a variety of ways, typically about 60–70 weight percent flour, 15–20 weight percent dry mix, 10–20 weight percent water and 1–10 weight percent shortening can be combined to produce the bakery product of the invention. The normal and preferred procedure for mixing is to first form the sponge with a portion of the flour and water and then add the barbecue mix, remainder of the flour and shortening, in that order. Subsequent to mixing, the dough is allowed to air-dry for about 10 minutes before baking.

While the mechanism responsible for the unexpected synergism which has been found between the ingredients of the present invention is not completely understood, it has nevertheless been discovered that an unexpected retention of flavor and aroma results from this unique combination of spices and flavoring components which, when employed independently in bakery products have not produced the results obtained according to this invention.

The following examples will be understood to be merely illustrative of the invention.

EXAMPLE 1

One-hundred pounds of dry mix were formulated from the following ingredients:

| Ingredient: | Amount (lbs.) |
|---|---|
| Flour | 31.25 |
| Salt | 12.50 |
| Powdered molasses | 5.00 |
| Dry milk | 10.00 |
| Chili powder | 5.00 |
| Barbecue powder | 10.00 |
| Calcium propionate | 3.75 |
| Emulsifier | 2.50 |
| Wheat gluten | 10.00 |
| Smoke yeast | 10.00 |

Subsequent to mixing, 25 pounds of the dry mix were blended with a total of 100 pounds additional flour, 3 pounds of shortening and 20 pounds of water to make a bread dough. After being allowed to air-dry for 10 minutes this dough was baked into a delicious hickory-flavored bread which retained the full flavor and aroma of hickory smoke.

EXAMPLE 2

"Regular" hickory-smoked barbecue bakery products were also prepared from the following two sets of ingredients in the indicated proportions and sequence:

GROUP I

| Reference number | Ingredient | Pounds | Ounces |
|---|---|---|---|
| 1 | Sugar, granulated | 1 | 12 |
| 2 | Salt | 0 | 4 |
| 3 | Shortening | 1 | 12 |
| 4 | Milk, evaporated whole | 4 | 0 |
| 5A | Water | 3 | 8 |

GROUP II

| Reference number | Ingredient | Pounds | Ounces |
|---|---|---|---|
| 5B | Water | 1 | 0 |
| 6 | Flour, hard | 14 | 0 |
| 7 | Yeast, compressed | 0 | 8 |
| 8A | Barbecue sauce | 0 | 24 |
| 8B | Barbecue powder | 0 | 7 |
| 9 | Brown sugar | 0 | 10 |
| 10 | Liquid smoke | 0 | 20 |
| 11 | Chili powder | 0 | 7 |

The ingredients 1 through 5A, granulated sugar, salt, shortening, evaporated whole milk, and water, in the proportions given, were mixed in a bowl until the sugar and salt were dissolved thoroughly. Then flour, 6, was sifted and added to ingredients 1 through 5A and ingredients 8A through 11, added. Subsequently, yeast 7, was suspended in water, 5B. When so suspended, it was added to ingredients 1 through 6 and 8A through 11 and mixing continued until a glutenous dough was obtained.

Some variation in the water may be undertaken to match various types of flour. Also, the water temperature was regulated to obtain glutenous dough within the temperautre range of 78 to 82 degrees Fahrenheit.

Where an active dry yeast, 7B, is available in lieu of compressed yeast, 7, only four ounces are used instead of eight ounces.

After obtaining this glutenous dough, there was allowed a "floor time" of approximately thirty minutes at an eighty-degree Fahrenheit temperature. Then the dough was "punched" and "set" for ten minutes. During a follow-on time of thirty-five to forty-five minutes, the dough was prepared for bread, dinner rolls, hamburger buns, hot dog buns, etc. The various products were baked at four-hundred degrees Fahrenheit for twenty-five to twenty-eight minutes. After cooling, they were prepared for delivery.

EXAMPLE 3

A "mild" hickory-smoked barbecue bakery product was prepared using the following ingredients and procedures:

| Reference number | Ingredient | Pounds | Ounces |
|---|---|---|---|
| 1 | Sugar | 1 | 10 |
| 2 | Salt | 0 | 6 |
| 3 | Shortening | 1 | 12 |
| 4 | Powdered skim milk | 2 | 0 |
| 5 | Water | 8 | 0 |
| 6 | Flour | 18 | 0 |
| 7 | Yeast | 2 | 8 |
| 8 | Barbecue sauce | 0 | 36 |
| 9 | Brown sugar | 0 | 10 |
| 10 | Liquid smoke | 0 | 10 |
| 11 | Chili powder | 0 | 12 |

Method of Making These Mild Hickory-Smoked French Barbecue Bakery Products

The ingredients, 1 through 11, sugar, salt, shortening, powdered skim milk, water, flour, yeast, barbecue sauce, brown sugar, liquid smoke and chili powder, in the proportions given, were mixed in a bowl for ten minutes using a mixing machine operating at its third-speed setting. The resulting dough was held for thirty minutes "floor time" at an eighty-degree Fahrenheit temperature. Thereafter, it was "punched." Then it was "set" for ten minutes. During a follow-on time of thirty-five to forty-five minutes, the dough was prepared for bread, dinner rolls, hamburger buns, hot dog buns, hoagy buns, etc. The various products were baked at four-hundred degrees Fahrenheit for twenty-five to twenty-eight minutes. After cooling they were prepared for wrapping and delivery.

I claim:

1. A dry mix from which smoked barbecue flavored bakery products can be prepared comprising about:
   25–65 weight percent flour
   6–11 weight percent dry milk
   2–8 weight percent powdered molasses or brown sugar
   1–15 weight percent salt
   2–16 weight percent dry yeast
   7–16 weight percent barbecue spices
   2–6 weight percent liquid or powdered smoke.

2. The dry mix of Claim 1 which further includes one or more of the substances selected from the group consisting of up to about 16 weight percent wheat gluten, up to about 4 weight percent emulsifier, up to about 8 percent additional sugar, and up to about 5 percent of a preservative.

3. A bakery dough composition comprising the dry mix of Claim 1 together with about 10–20 weight percent water and about 1–10 weight percent shortening.

4. A bakery dough composition comprising about 15–20 weight percent of the dry mix of Claim 1, 60–70 weight percent flour, 10–20 weight percent water, and 1–10 weight percent shortening.

5. A dry mix for preparing smoked barbecue flavored bakery products which comprises about:
   28–35 weight percent flour
   10–14 weight percent salt
   4–6 weight percent dry molasses
   9–11 weight percent powdered milk
   4–6 weight percent chili powder
   9–11 weight percent barbecue powder
   2–4 weight percent preservative
   9–11 weight percent wheat gluten
   9–11 weight percent smoke-flavored yeast.

6. A bakery dough composition comprising about 15–20 weight percent of the dry mix of Claim 5, 60–70 weight percent flour, 10–20 weight percent water, and 1–10 weight percent shortening.

7. A dry mix from which smoked barbecue flavored bakery products can be prepared comprising about:
25–65 weight percent flour
6–11 weight percent dry milk
2–8 weight percent powdered molasses or brown sugar
1–5 weight percent salt
2–16 weight percent smoke-flavored yeast
7–16 weight percent barbecue spices.

References Cited
UNITED STATES PATENTS

| | | | |
|---|---|---|---|
| 2,893,879 | 7/1959 | Huckabee | 99—90(S) X |
| 3,106,473 | 10/1963 | Hollenbeck | 99—140(R) X |

JAMES R. HOFFMAN, Primary Examiner

U.S. Cl. X.R.
426—19